US00RE48964E

(19) United States
(12) Reissued Patent
Yamagata et al.

(10) Patent Number: US RE48,964 E
(45) Date of Reissued Patent: Mar. 8, 2022

(54) ELECTROMAGNETIC RELAY

(71) Applicant: PANASONIC INTELLECTUAL PROPERTY MANAGEMENT CO., LTD., Osaka (JP)

(72) Inventors: Katsutoshi Yamagata, Hokkaido (JP); Tsukasa Nishimura, Hokkaido (JP)

(73) Assignee: PANASONIC INTELLECTUAL PROPERTY MANAGEMENT CO., LTD., Osaka (JP)

(21) Appl. No.: 16/448,339

(22) Filed: Jun. 21, 2019

Related U.S. Patent Documents

Reissue of:
(64) Patent No.: 9,711,311
Issued: Jul. 18, 2017
Appl. No.: 15/074,912
Filed: Mar. 18, 2016

(30) Foreign Application Priority Data

Apr. 7, 2015 (JP) ..... 2015-078645

(51) Int. Cl.
*H01H 51/22* (2006.01)
*H01H 50/56* (2006.01)
(Continued)

(52) U.S. Cl.
CPC ..... *H01H 50/56* (2013.01); *H01H 9/443* (2013.01); *H01H 50/18* (2013.01); *H01H 50/38* (2013.01); *H01H 50/546* (2013.01)

(58) Field of Classification Search
CPC ..... H01H 50/56; H01H 9/443; H01H 50/38; H01H 50/546; H01H 50/18; H01H 1/22;
(Continued)

(56) References Cited

U.S. PATENT DOCUMENTS 5,109,146 A * 4/1992 Maenishi ..... H01H 9/443 218/26
2012/0313737 A1* 12/2012 Iwamoto ..... H01H 50/56 335/185
(Continued)

FOREIGN PATENT DOCUMENTS

CN 201527938 U 7/2010
CN 202013854 U 10/2011
(Continued)

OTHER PUBLICATIONS

English Translation of Chinese Search Report dated Aug. 6, 2020 for Chinese Patent Application No. 201910405741.0.
(Continued)

*Primary Examiner* — Kenneth Whittington
(74) *Attorney, Agent, or Firm* — Greenblum & Bernstein, P.L.C.

(57) ABSTRACT

An electromagnetic relay includes an exciting coil, a pair of fixed contacts, a movable spring, a magnet, and a yoke in contact with the magnet. The pair of fixed contacts is arranged along a first direction. The movable spring comes into contact with or moves away from the fixed contacts in response to the turn on or off of current to the exciting coil. The magnet prolongs the arc generated between the fixed contacts and the movable spring. The magnet is adjacent to the fixed contacts along a second direction orthogonal to the first direction, and is adjacent to the exciting coil along a third direction orthogonal to the first direction and the second direction. The yoke is adjacent to the fixed contacts along the third direction in a state where the yoke is in contact with the magnet.

12 Claims, 12 Drawing Sheets

(51) Int. Cl.

| | |
|---|---|
| ***H01H 9/44*** | (2006.01) |
| ***H01H 50/18*** | (2006.01) |
| ***H01H 50/38*** | (2006.01) |
| ***H01H 50/54*** | (2006.01) |

(58) Field of Classification Search
CPC ..... H01H 1/2075; H01H 50/02; H01H 1/34; H01H 51/065
USPC ..... 335/78, 126, 131, 201
See application file for complete search history.

(56) References Cited

U.S. PATENT DOCUMENTS

2013/0285774 A1* 10/2013 Hasegawa ..... H01H 3/28 335/189
2013/0293324 A1* 11/2013 Fujimoto ..... H01H 50/026 335/156
2014/0028418 A1* 1/2014 Yamashita ..... H01H 50/38 335/201
2014/0151337 A1* 6/2014 Hiraiwa ..... H01H 33/182 218/26
2014/0159837 A1* 6/2014 Hiraiwa ..... H01H 9/443 335/201

FOREIGN PATENT DOCUMENTS

| | | | |
|---|---|---|---|
| CN | 102820172 | A | 12/2012 |
| JP | 54-072634 | U | 5/1979 |
| JP | 10-223110 | A | 8/1998 |
| JP | 10-326553 | | 12/1998 |
| JP | 3058668 | U | 6/1999 |
| JP | 2006-351240 | A | 12/2006 |

OTHER PUBLICATIONS

English Translation of Chinese Search Report dated Oct. 9, 2020 for Chinese Patent Application No. 201910409839.3.

* cited by examiner

ELECTROMAGNETIC RELAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

The present disclosure relates to an electromagnetic relay, and more specifically to a hinge type electromagnetic relay.

2. Description of the Related Art

Conventionally, an electromagnetic relay is known which includes a permanent magnet for extinguishing an arc generated when a movable contact moves away from a fixed contact.

For example, the electromagnetic relay disclosed in Unexamined Japanese Patent Publication No. H10-326553 includes a permanent magnet disposed near a contact portion (fixed contact and movable contact). In this electromagnetic relay, the arc generated between the movable contact and the fixed contact is prolonged by a magnetic force of the permanent magnet, and then is extinguished.

SUMMARY

The present disclosure provides an electromagnetic relay of a high breaking capability (interruption ability) without enlarging the size thereof.

The electromagnetic relay of the present disclosure includes an exciting coil, a pair of fixed contacts, a movable spring, a magnet, and a yoke. The pair of fixed contacts is arranged along first direction. The movable spring conies into contact with or moves away from the pair of fixed contacts in response to the turn on or off of current to the exciting coil. The magnet prolongs the arc generated between the pair of fixed contacts and the movable spring. The yoke is in contact with the magnet. The magnet is adjacent to the pair of fixed contacts along a second direction orthogonal to the first direction, and is adjacent to the exciting coil along a third direction orthogonal to the first direction and the second direction. The yoke is adjacent to the pair of fixed contacts along the third direction in a state where the yoke is in contact with the magnet.

In the present disclosure, the magnetic flux densities near the contacts (fixed contacts and movable spring) and in an arc extinguishing space can be increased. Therefore, the breaking capability can he increased without enlarging the sizes of the magnet and electromagnetic relay.

DETAILED DESCRIPTION OF PREFERRED EMBODIMENTS

Prior to the descriptions of exemplary embodiments of the present disclosure, problems of the conventional electromagnetic relay are briefly described. In the conventional electromagnetic relay, a permanent magnet is disposed near a contact. Therefore, a small-sized permanent magnet must be used for extinguishing an arc. As a result, the magnetic flux density near the contact is small, and the breaking capability is not sufficient.

When a large-sized permanent magnet is used in order to solve the problem, the whole electromagnetic relay is also enlarged.

Figure 1:
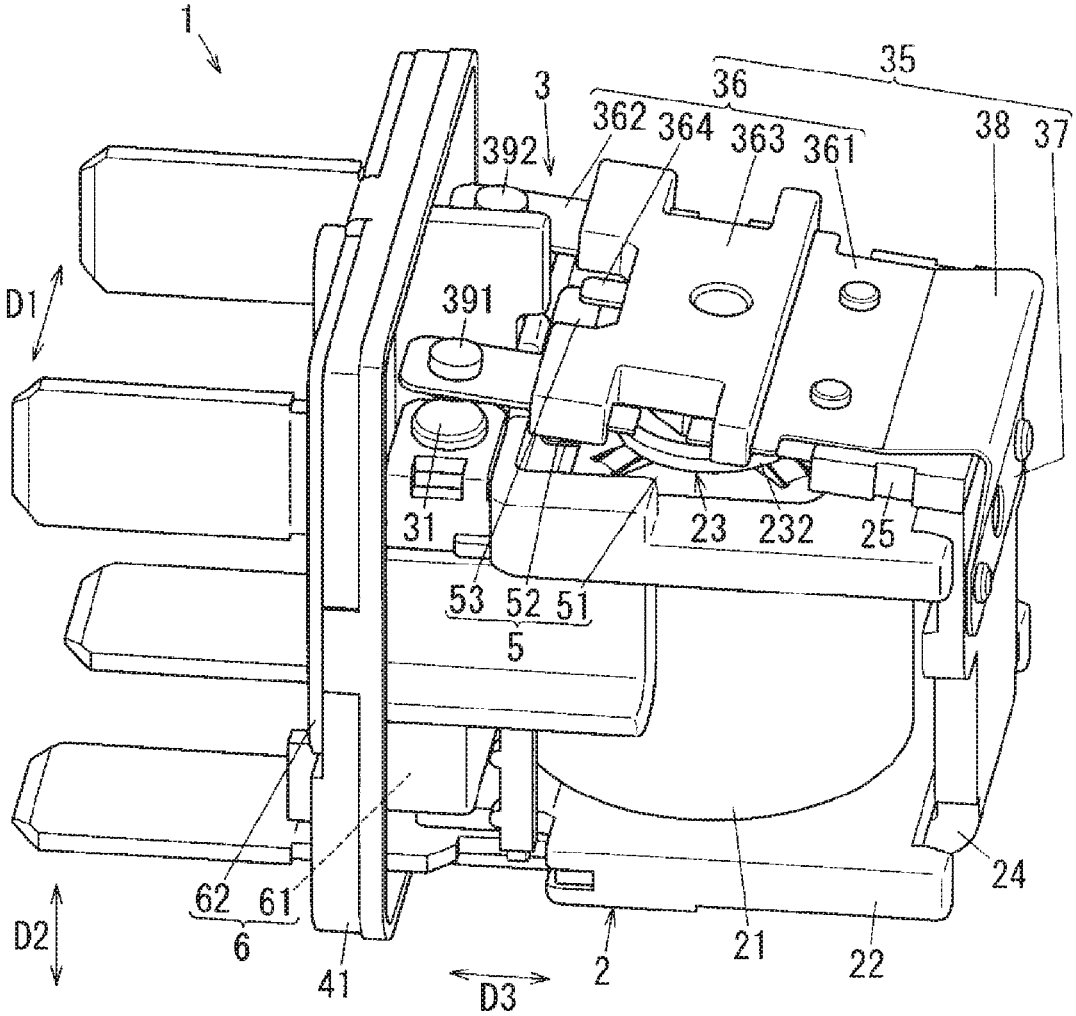
FIG. 1 is a perspective view of an electromagnetic relay in accordance with an exemplary embodiment of the present disclosure.
Figure 2:
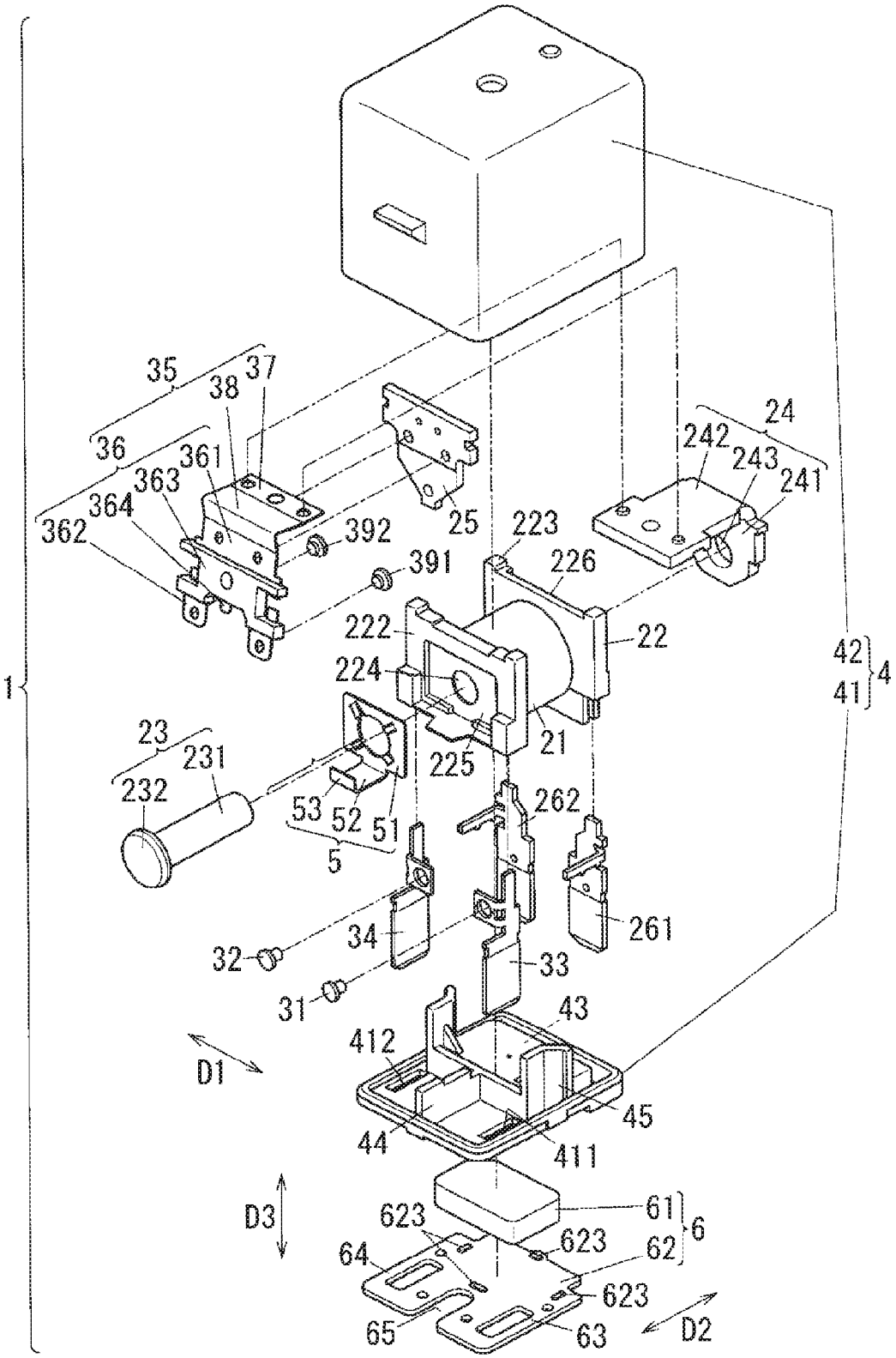
FIG. 2 is an exploded perspective view of the electromagnetic relay shown in FIG. 1.
Figure 3:
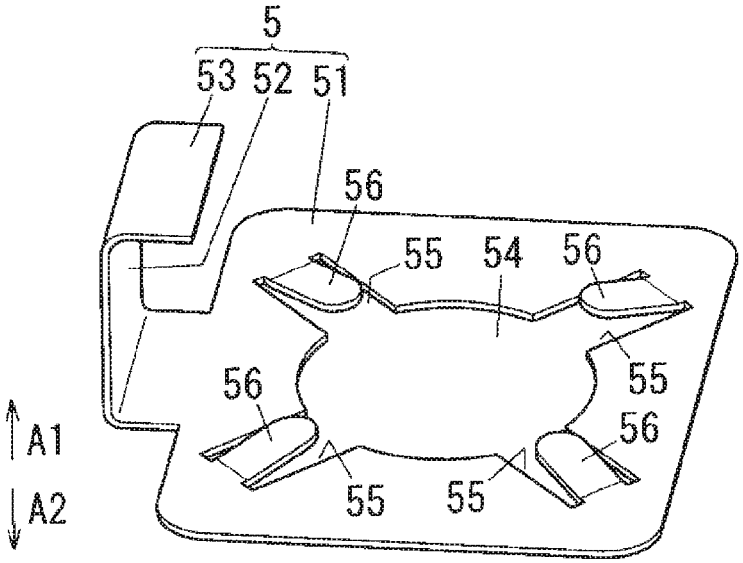
FIG. 3 is a perspective view of a stopper of the electromagnetic relay shown in FIG. 1.
Figure 4:
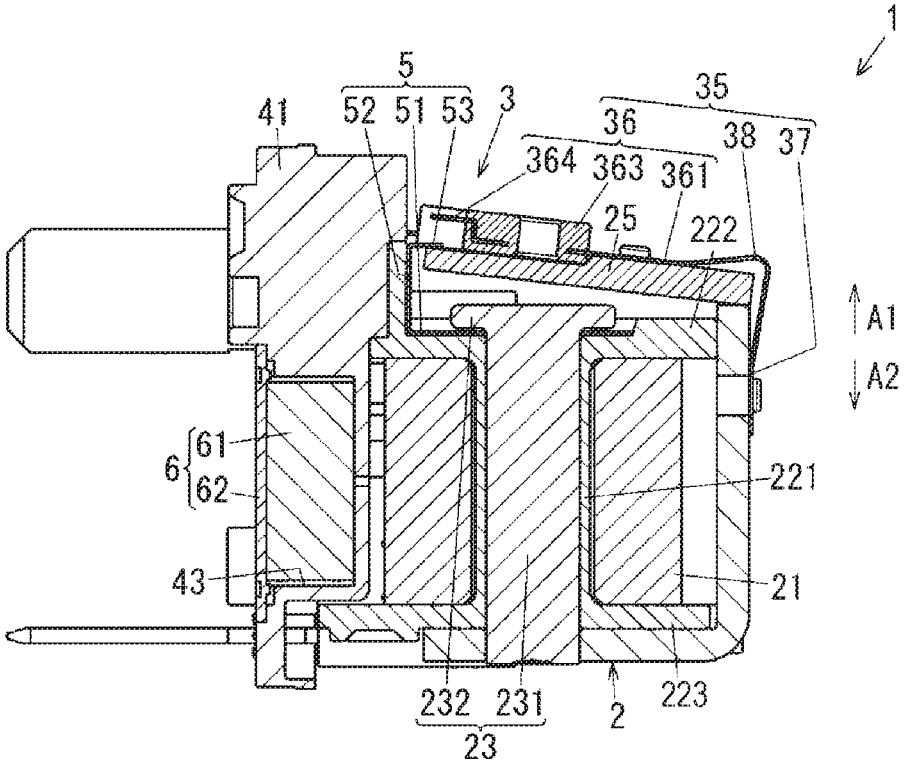
FIG. 4 is a sectional view of the electromagnetic relay shown in FIG. 1.
Figure 5:
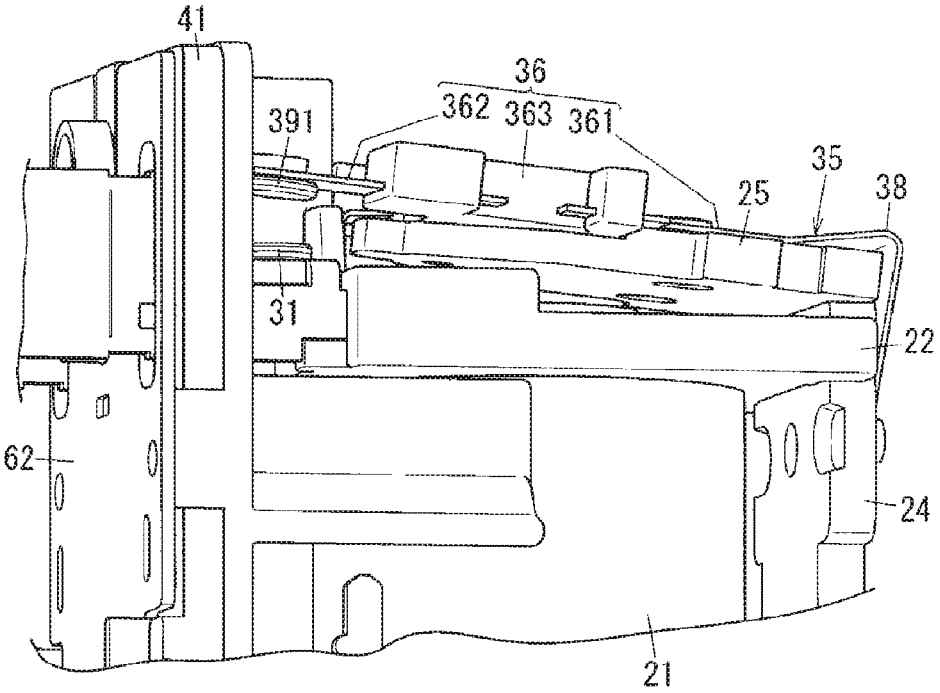
FIG. 5 is a perspective view of an essential part of the electromagnetic relay shown in FIG. 1.
Figure 6:
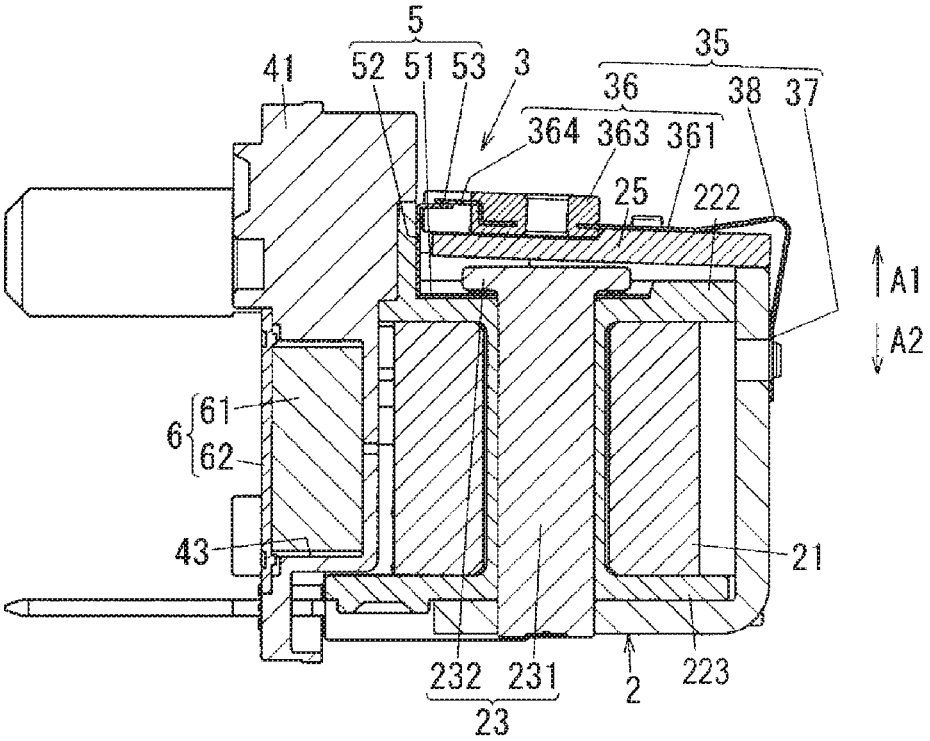
FIG. 6 is a sectional view of the electromagnetic relay shown in FIG. 1 in another state.
Figure 7:
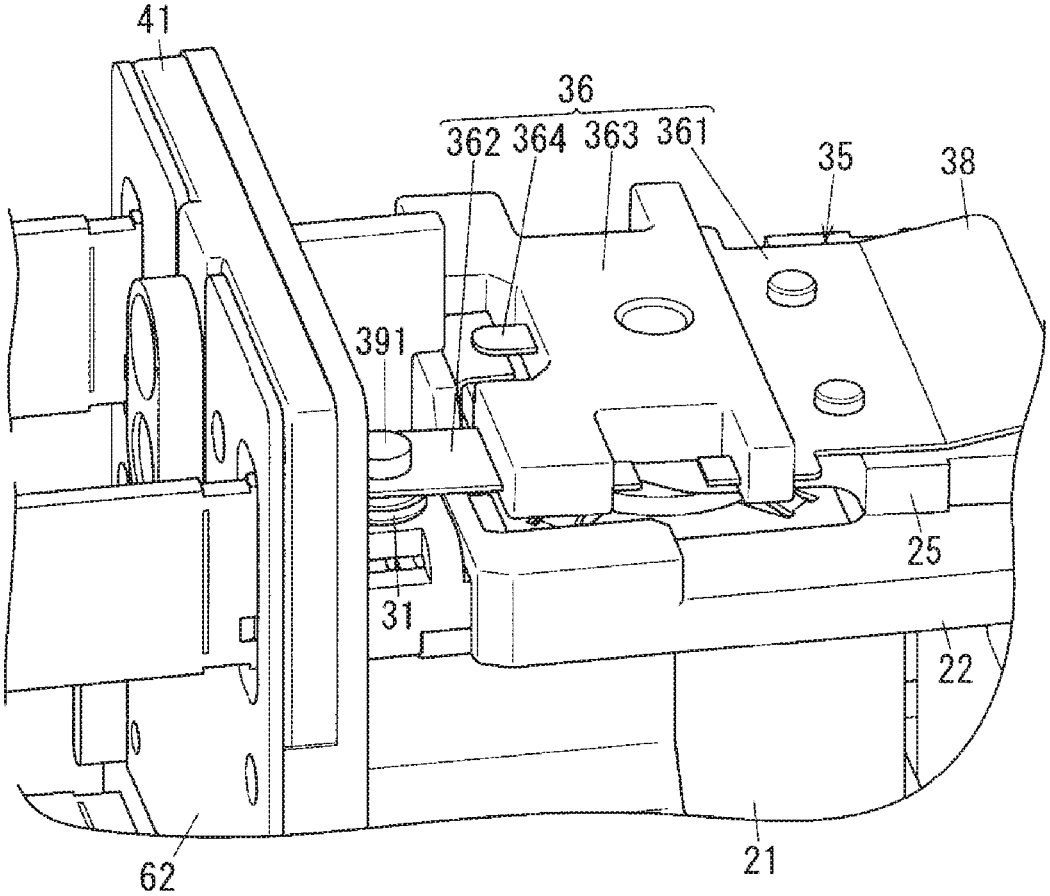
FIG. 7 is another perspective view of the essential part of the electromagnetic relay shown in FIG. 1.

Hereinafter, electromagnetic relay 1 of the exemplary embodiment of the present disclosure is described with reference to the accompanying drawings. FIG. 1 and FIG. 2 are a perspective view and an exploded perspective view of electromagnetic relay 1, respectively. FIG. 3 is a perspective view of stopper 5 of electromagnetic relay 1. FIG. 4 is a sectional view of electromagnetic relay 1 when the current supplied to exciting coil 21 is cut off. FIG. 5 is a perspective view of an essential part of electromagnetic relay 1 when the current supplied to exciting coil 21 is cut off. FIG. 6 is a sectional view of electromagnetic relay 1 when exciting coil 21 is energized. FIG. 7 is a perspective view of the essential part of electromagnetic relay 1 when exciting coil 21 is energized.

As shown in FIGS. 1 and 2, electromagnetic relay 1 includes electromagnet block 2, contact block 3, case 4, stopper 5, and arc extinguishing, mechanism 6.

As shown in FIG. 2, electromagnet block 2 of FIG. 1 includes exciting coil 21, bobbin 22, iron core 23, yoke 24, armature 25, and a pair of coil terminals 261 and 262.

Bobbin 22 includes cylinder 221 and a pair of flanges 222 and 223 as shown in FIG. 4. Cylinder 221 is provided with through hole 224 in the axial direction as shown in FIG. 2. In other words, cylinder 221 is formed in a hollow cylindrical shape. Each of flanges 222 and 223 is formed in a substantially rectangular plate shape, for example, and flanges 222 and 223 are disposed at opposite ends in the axial direction of cylinder 221. Cylinder 221 and flanges 222 and 223 are formed integrally and are made of an insulating material such as a resin. Exciting coil 21 is wound on cylinder 221. Recess 225 is formed in substantially the center of the surface of cylinder 221 that has flange 222.

Iron core 23 is inserted into through hole 224 in bobbin 22 and faces (opposes) armature 25. Iron core 23 includes shaft 231 and flange 232. Shaft 231 is formed in a column shape, in more detail, shaft 231 is formed in a long circular column (solid cylinder) shape. Flange 232 is formed at one end of shaft 231. Shaft 231 and flange 232 are formed integrally and are made of a magnetic material.

Yoke 24 includes first piece 241 and second piece 242, and is formed in a substantially L shape. First piece 241 and second piece 242 are formed integrally and are made of a magnetic material. First piece 241 is engaged with bobbin 22 at recess 226 provided on flange 223. First piece 241 is provided with through hole 243. Iron core 23 is inserted into through hole 243. Second piece 242 is extended from one end of first piece 241 perpendicularly to the first piece 241. In other words, second piece 242 is extended along the axial direction of cylinder 221 of bobbin 22.

Armature 25 is attached to movable portion 36 of movable spring 35, and is displaced integrally with movable portion 36. More specifically, armature 25 is attached to movable portion 36 and is disposed so as to face iron core 23. Armature 25 is made of a magnetic material and is formed in a long tabular shape. One end of armature 25 is in contact with second piece 242 of yoke 24.

Each of coil terminals 261 and 262 is made of a conductive material such as copper and is formed in a long plate shape. Tips of exciting coil 21 are wound on coil terminals 261 and 262, respectively, and are connected to them, respectively, by solder or the like.

As shown in FIG. 2, contact block 3 of FIG. 1 includes a pair of fixed contacts 31 and 32, a pair of main terminals 33 and 34, and movable spring 35.

Fixed contact 31 is coupled to main terminal 33, and fixed contact 32 is coupled to main terminal 34. Each of main terminals 33 and 34 is made of a conductive material such as copper.

Movable spring 35 is configured to come into contact with or move away from fixed. contacts 31 and 32 in response to the turn on or off of the current to exciting coil 21. Movable spring 35 includes movable portion 36, fixed portion 37, and return spring 38. Movable spring 35 is formed in a substantially L shape.

Movable portion 36 comes into contact with or moves away from fixed contact 31 or 32 in response to the current to exciting coil 21. Movable portion 36 includes base 361, contact pressure portion 362, and molded portion 363. Movable portion 36 further includes projection 364. The part of movable portion 36 other than molded portion 363 is made of a metal such as copper. Molded portion 363 is made of an insulating material such as a resin. Armature 25 is fixed to a surface of movable portion 36, where the surface faces (opposes) iron core 23.

Contact pressure portion 362 is deformed when exciting coil 21 is energized. Contact pressure portion 362 includes a pair of movable contacts 391 and 392 as shown in FIG. 1. Fixed contacts 31 and 32 are arranged along first direction D1. Movable contact 391 is disposed at a position facing fixed contact 31, and movable contact 392 is disposed at a position facing fixed contact 32. Movable contact 391 comes into contact with or moves away from fixed contact 31, and movable contact 392 comes into contact with or moves away from fixed contact 32.

Projection 364 is disposed between movable contacts 391 and 392. More specifically, projection 364 is disposed so as to project from molded portion 363 between movable contacts 391 and 392. When exciting coil 21 is energized, projection 364 comes into contact with stopper 5. Preferably, projection 364 has elasticity. Therefore, it is preferable that the ratio of the width of projection 364 with respect to the length of projection 364 is smaller.

Fixed portion 37 is fixed to electromagnet block 2. More specifically, fixed portion 37 is fixed to second piece 242 of yoke 24 by screwing, for example. Thus, movable spring 35 is fixed to yoke 24.

When exciting coil 21 is energized, armature 25 is attracted to iron core 23 by the magnetic force. Therefore, movable portion 36 deforms about fixed portion 37 as the fulcrum, and movable contacts 391 and 392 in movable portion 36 come into contact with fixed contacts 31 and 32, respectively. In movable spring 35, when the current supplied to exciting coil 21 is cut off, movable portion 36 moves away from fixed contacts 31 and 32 by a return force (elastic force).

Case 4 includes substantially rectangular tabular base 41, and substantially rectangular box-shaped cover 42 that covers base 41. One surface of cover 42 is open. Case 4 accommodates exciting coil 21, bobbin 22, iron core 23, yoke 24, armature 25, the pair of fixed contacts 31 and 32, and movable spring 35.

Base 41 is provided with through hole 411 into which main terminal 33 is inserted, through hole 412 into which main terminal 34 is inserted, a through hole (not shown) into which coil terminal 261 is inserted, and another through hole (not shown) into which coil terminal 262 is inserted. Base 41 is further provided with recess 43 opening outward as shown in FIG 4. More specifically, base 41 includes recess 43 at a position adjacent to exciting coil 21 in third direction D3 shown in FIG. 1. Permanent magnet (hereinafter referred to as "magnet") 61 is stored in recess 43. Base 41 includes wall 44 disposed between fixed contacts 31 and 32 as shown in FIG. 2. Wall 44 is disposed so as to separate fixed contact 31 from fixed contact 32. Base 41 also includes support portion 45 for supporting exciting coil 21.

Stopper 5 restricts the movement of movable portion 36 of movable spring 35. In more detail, when the current supplied to exciting coil 21 is cut off, stopper 5 restricts the movement of movable portion 36 (movable contacts 391 and 392) of movable spring 35 after movable portion 36 of movable spring 35 moves away from fixed contacts 31 and 32. Stopper 5 is made of a metal. Preferably, stopper 5 is made of the same metal as that of movable spring 35. However, the material of stopper 5 is not limited to the same metal, but may be a material different from the same metal. It is preferable that stopper 5 is made of a nonmagnetic material. However, the material of stopper 5 is not limited to the nonmagnetic material, but may be a magnetic material.

Stopper 5 integrally includes base 51, extending portion 52, and abutting portion 53 as shown in FIG. 3.

Base 51 is fixed to electromagnet block 2. In more detail, base 51 is fixed to bobbin 22. Base 51 is provided with through hole 54 into which shaft 231 of iron core 23 is inserted. Then, base 51 is engaged with bobbin 22 at recess 225 formed in substantially the center of flange 222. Base 51 is grasped by flange 232 of iron core 23 and bobbin 22 in a state where shaft 231 of iron core 23 is inserted into through hole 54. Base 51 is further provided with four recesses 55 around through hole 54. Base 51 includes four contact pieces 56 disposed in four recesses 55, respectively. The tip of each of contact pieces 56 is tilted so as to be closer to flange 232 of iron core 23 than each base end. Thus, when base 51 is grasped by flange 232 of iron core 23 and bobbin 22, base 51 can be fixed further firmly.

Extending portion 52 extends from base 51. In more so detail, extending, portion 52 extends from base 51 along, the direction having an angle of 90° with respect to the surface (main surface) of base 51 that is in contact with the bottom surface of recess 225.

Abutting portion 53 has elasticity. Abutting portion 53 is disposed at the tip of extending portion 52. In the example shown in FIG. 3, abutting portion 53 is formed in a tabular shape. Abutting portion 53 is projected from the tip of extending portion 52 so as to form an angle of 90° with the extending direction of extending portion 52. In other words, abutting portion 53 is extended substantially in parallel with the main surface of base 51.

When exciting coil 21 is energized, abutting portion 53 abuts on movable portion 36. When the current supplied to exciting coil 21 is cut off, abutting portion 53 abuts on armature 25.

When movable portion 36 abuts on abutting portion 53, abutting portion 53 is deflected thanks to the elasticity along direction A1 in which movable contacts 391 and 392 of movable portion 36 move away from fixed contacts 31 and 32. In other words, abutting portion 53 has elasticity so that abutting portion 53 can be deflected along direction A1 in which movable contacts 391 and 392 move away from fixed contacts 31 and 32. Thus, abutting portion 53 decreases the amount of movement per unit time of movable portion 36 of movable spring 35 in direction A1 in comparison to that before movable portion 36 abuts on abutting portion 53. Here, the amount of movement per unit time indicates the moving speed of movable portion 36. Note that abutting portion 53 abuts alternately on movable portion 36 of movable spring 35 and armature 25 more preferably at a portion of the tip or the vicinity thereof than at a portion of the base end or the vicinity thereof that is close to extending portion 52.

When the current supplied to exciting coil 21 is cut off, as shown in FIG. 4 and FIG. 5, stopper 5 abuts on armature 25 that is displaced integrally with movable spring 35. When exciting coil 21 is energized, as shown in FIG. 6 and FIG. 7, stopper 5 abuts on projection 364 of movable portion 36 before movable contacts 391 and 392 of movable portion 36 of movable spring 35 come into contact with fixed contacts 31 and 32. Thus, stopper 5 decreases the moving speed of movable portion 36 in direction A2. Direction A2 indicates the direction in which movable portion 36 (movable contacts 391 and 392) approaches fixed contacts 31 and 32. Then, when the current supplied to exciting coil 21 is cut off, as shown in FIG. 4 and FIG. 5, stopper 5 abuts on armature 25 that is displaced integrally with movable spring 35. Thus, stopper 5 restricts the movement of movable portion 36 in direction A1.

Figure 8:
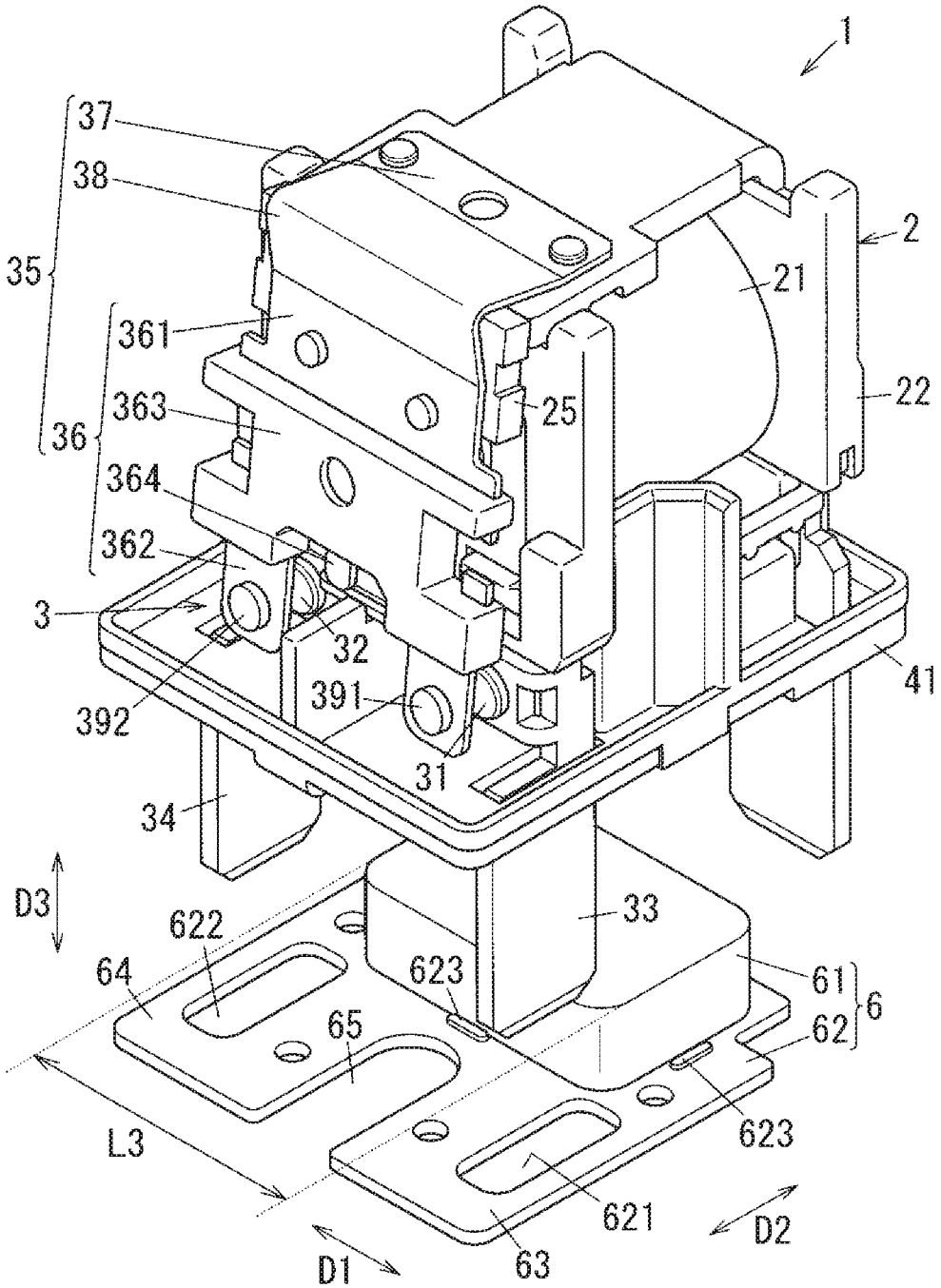
FIG. 8 is an exploded perspective view of the electromagnetic relay shown in FIG. 1 in a partially exploded state.

FIG. 8 is an exploded perspective view of electromagnetic relay 1 in a partially exploded state. Arc extinguishing mechanism 6 includes magnet 61 and yoke 62.

When magnet 61 is stored in recess 43 of base 41, magnet 61 is adjacent to fixed contacts 31 and 32 along second direction D2 that is orthogonal to first direction D1. At this time, magnet 61 is adjacent to exciting coil 21 along third direction D3 that is orthogonal to first direction D1 and second direction D2. Magnet 61 is a ferrite magnet, for example. In the present exemplary embodiment, the north (N) pole of magnet 61 faces yoke 62, and the south (S) pole faces exciting coil 21. Magnet 61 is disposed for prolonging the arc generated between fixed contacts 31 and 32 and movable contacts 391 and 392 of movable spring 35.

Yoke 62 is made of a material of a high magnetic permeability, such as a ferrous material (for example, zinc-coated steel plate). Yoke 62 is in contact with magnet 61. More specifically, yoke 62 is attached on magnet 61 by the magnetic force. Yoke 62 is adjacent to fixed contacts 31 and 32 in third direction D3 in a state where yoke 62 is in contact with magnet 61. Furthermore, yoke 62 is in contact with the outer surface of case 4 in the state where yoke 62 is in contact with magnet 61.

Figure 9:
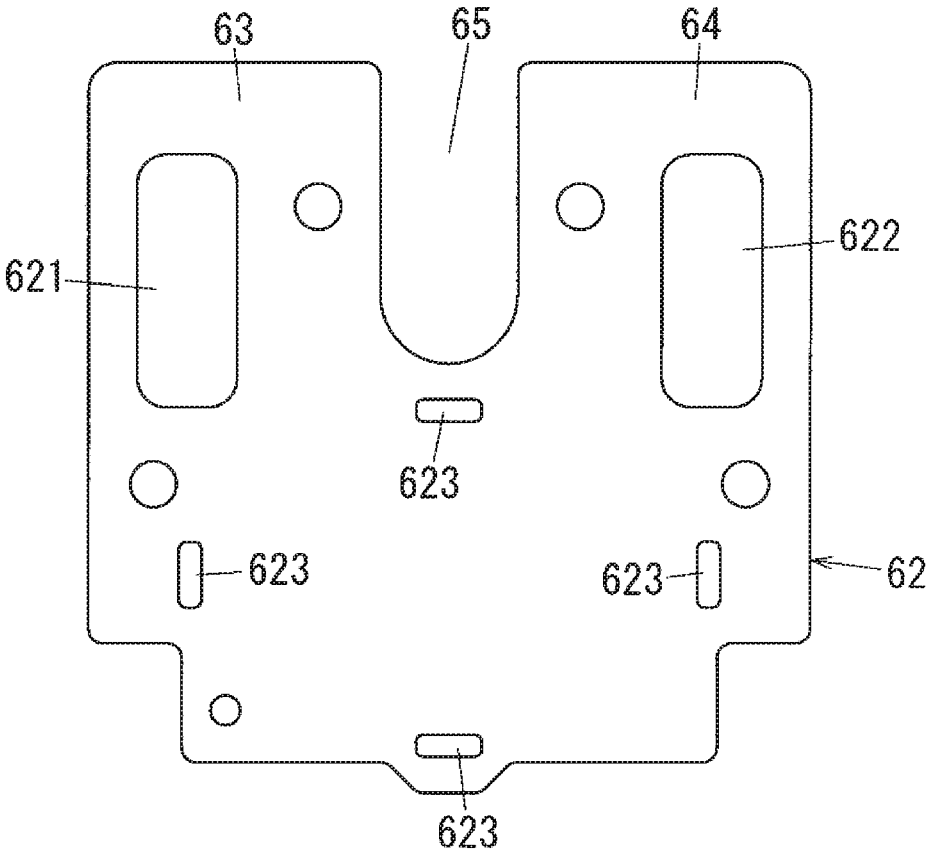
FIG. 9 is a plan view of a yoke of the electromagnetic relay shown in FIG. 1.

FIG. 9 is a plan view of yoke 62. Yoke 62 is provided with through hole 621 into which main terminal 33 is inserted, and through hole 622 into which main terminal 34 is inserted. Yoke 62 includes a plurality of (four in the shown example) projections 623 for positioning magnet 61.

Figure 10:
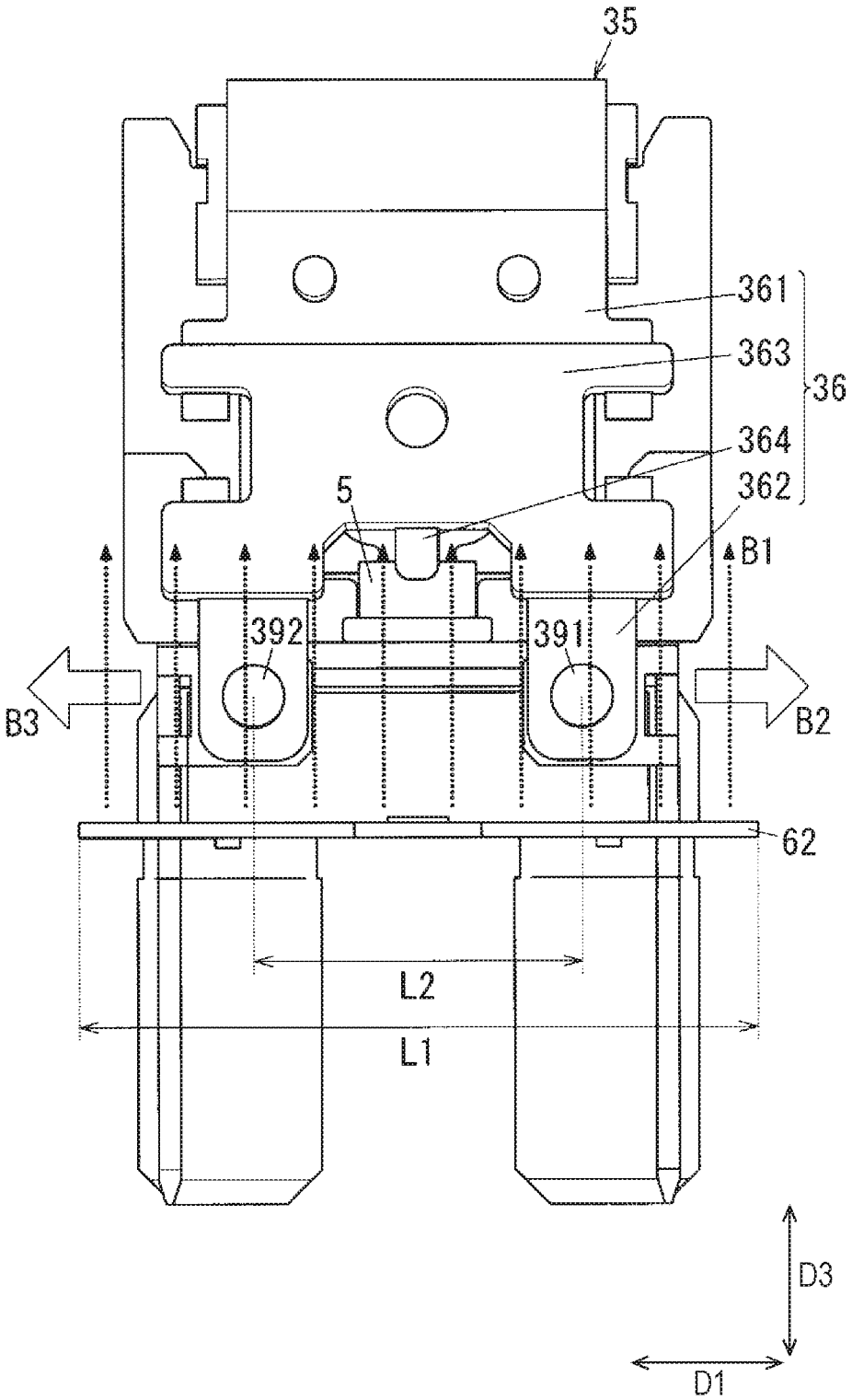
FIG. 10 and FIG. 11 are diagrams for illustrating a magnetic flux in the electromagnetic relay shown in FIG. 1.
Figure 11:
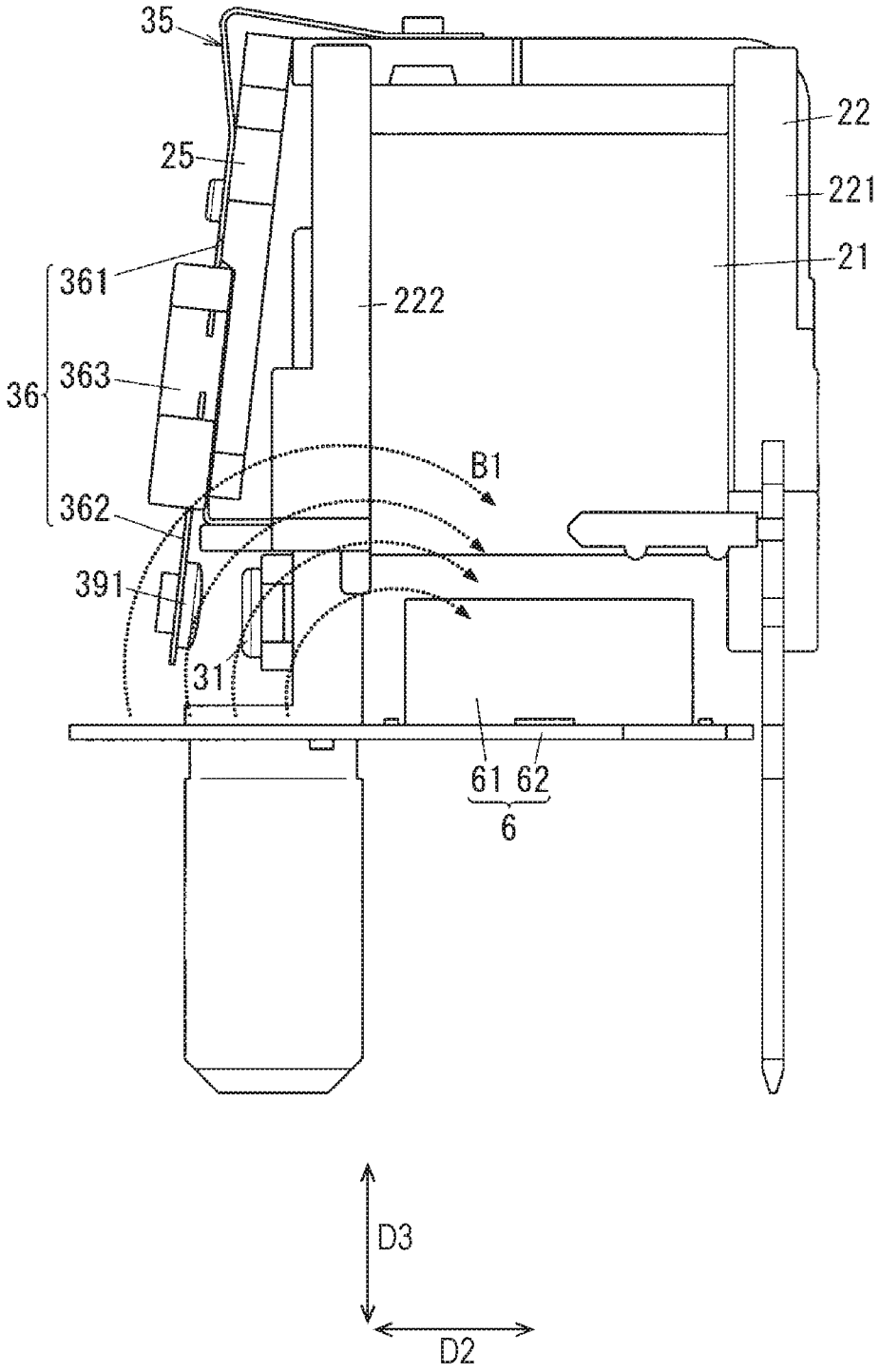

FIG. 10 and FIG. 11 are diagrams for illustrating a magnetic flux in electromagnetic relay 1. When the current supplied to exciting coil 21 is cut off, arcs is sometimes generated between movable contact 391 and fixed contact 31 and between movable contact 392 and fixed contact 32 while movable contacts 391 and 392 are moving away front fixed contacts 31 and 32. At this time, as shown in FIG. 10 and FIG. 11, arc extinguishing mechanism 6 (magnet 61 and yoke 62) generates a magnetic flux in third direction D3 near movable contacts 391 and 392 and fixed contacts 31 and 32 in the view from second direction D2. As discussed above, is first direction D1 means the direction in which fixed contacts 31 and 32 are arranged, second direction D2 means the direction in which movable contacts 391 and 392 face (oppose) fixed contacts 31 and 32, and third direction D3 is orthogonal to first direction D1 and second direction D2. According to Fleming's left-hand rule, a force is applied to the arc in first direction D1. Thus, the arc generated between movable contact 391 and fixed contact 31 can be prolonged in the direction of arrow B2, namely outward. The arc generated between movable contact 392 and fixed contact 32 can be also prolonged in the direction of arrow B3, namely outward.

Yoke 62 may include a pair of adjacent portions 63 and 64 adjacent to fixed contacts 31 and 32, and cutout 65 may be disposed between adjacent portions 63 and 64. Thus, the magnetic flux densities near movable contacts 391 and 392 and fixed contacts 31 and 32 can be increased, and the arcs can be prolonged more outward.

Meanwhile, as shown in FIG. 10, in first direction D1, length L1 of yoke 62 may be longer than distance L2 between fixed contacts 31 and 32. Furthermore, in first direction D1, length L1 of yoke 62 may be longer than length L3 of magnet 61 shown in FIG. 8. Thus, the arcs can be prolonged longer, so that the arcs can be extinguished rapidly.

Figure 12:
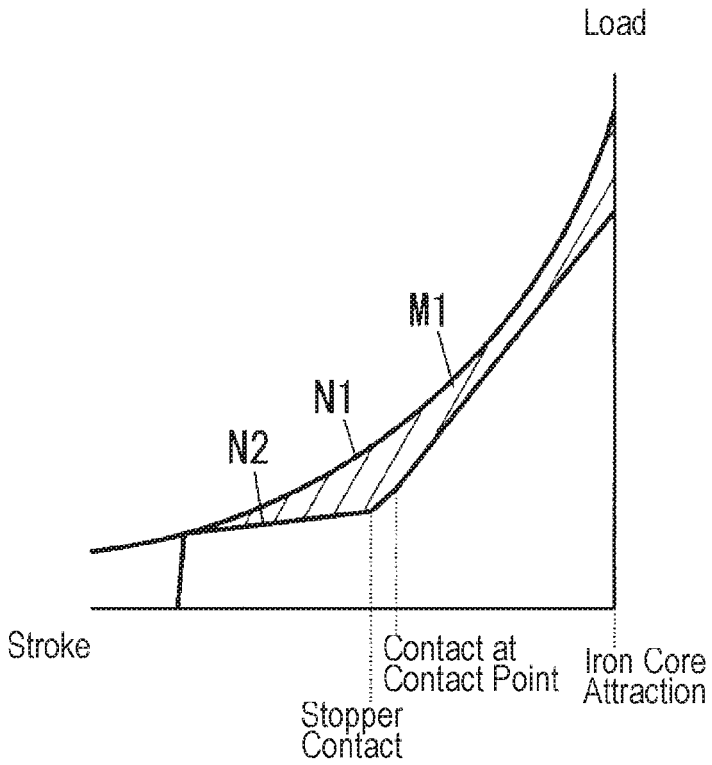
FIG. 12 is a diagram for illustrating the operation of the electromagnetic relay shown in FIG. 1.
Figure 13:
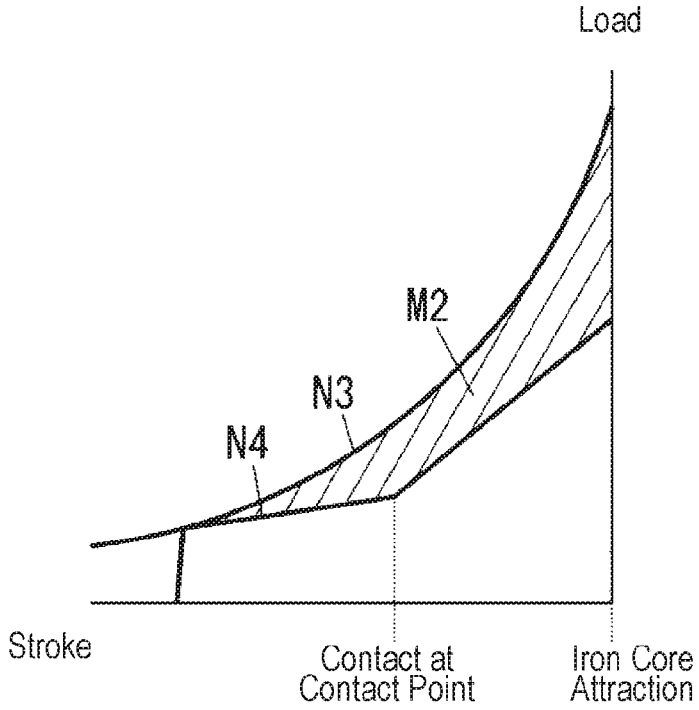
FIG. 13 is a diagram for illustrating the operation of an electromagnetic relay in a comparative example.

Next, the operation. of electromagnetic relay 1 is described with reference to FIG. 4 to FIG. 7, FIG. 12, and FIG. 13. FIG. 12 is a diagram for illustrating the operation of electromagnetic relay 1. FIG. 13 is a diagram for illustrating the operation of an electromagnetic relay in a comparative example. In FIG. 12 and FIG. 13, the horizontal axis shows stroke, and the vertical axis shows load.

First, before exciting coil 21 is energized, armature 25 is separate from iron core 23 and movable contacts 391 and 392 are separate from fixed contacts 31 and 32 in a state where movable spring 35 is attached on armature 25. Furthermore, armature 25 is in contact with stopper 5.

When exciting coil 21 is energized, iron core 23 is magnetized and armature 25 is attracted to flange 232 of iron core 23. In response to this phenomenon, the tip of movable portion 36 of movable spring 35 on which armature 25 is attached shifts. Then, movable contacts 391 and 392 come into contact with fixed contacts 31 and 32, respectively. As a result, movable contacts 391 and 392 are electrically connected to fixed contacts 31 and 32, respectively.

When exciting coil 21 is energized, armature 25 moves away front abutting portion 53 of stopper 5. Then, before movable contacts 391 and 392 conic into contact with fixed contacts 31 and 32, projection 364 of movable spring 35 abuts on abutting portion 53 of stopper 5. Thus, the moving speed of movable spring 35 is reduced.

Thus, in electromagnetic relay 1, projection 364 of movable spring 35 abuts on stopper 5 before movable contacts 391 and 392 come into contact with fixed contacts 31 and 32. Therefore, as shown in FIG. 12 and FIG. 13, contact collision energy M1 of electromagnetic relay 1 is smaller than contact collision energy M2 of the electromagnetic relay of the comparative example having no stopper 5. As shown in FIG. 12, contact collision energy M1 is the integrated value of the difference between attraction force curve N1 and spring load curve N2. While, as shown in 13, contact collision energy M2 is the integrated value of the difference between attraction force curve N3 and spring load is curve N4.

When the current supplied to exciting coil 21 is cut off, iron core 23 is demagnetized. Therefore, due to an elastic action of movable spring 35, armature 25 moves away from flange 232 of iron core 23 and movable portion 36 of movable spring 35 shifts. In response to this phenomenon, movable contacts 391 and 392 move away from fixed contacts 31 and 32. As a result, movable contacts 391 and 392 are electrically disconnected from fixed contacts 31 and 32.

As discussed above, when the current supplied to exciting coil 21 is cut off, due to an elastic action of movable spring 35, projection 364 of movable spring 35 moves away from stopper 5. Also, movable portion 36 of movable spring 35 shifts. Thereafter, armature 25 abuts on abutting portion 53 of stopper 5. At this time, stopper 5 reduces the impact of movable spring 35 because stopper 5 has elasticity.

Thus, when exciting coil 21 is energized in electromagnetic relay 1, projection 364 abuts on stopper 5 before movable contacts 391 and 392 come into contact with fixed contacts 31 and 32. At this time, stopper 5 decreases the moving speed of movable spring 35. In other words, stopper 5 restricts the movement of movable spring 35. Thus, compared with an electromagnetic relay having, no stopper, the contact collision energy when movable contacts 391 and 392 come into contact with fixed contacts 31 and 32 can be decreased in electromagnetic relay 1. As a result, the collision sound produced when movable contacts 391 and 392 of movable portion 36 of movable spring 35 come into contact with fixed contacts 31 and 32 can be reduced.

Furthermore, the decreased moving speed of movable spring 35 by stopper 5 allows the impact when armature 25 collides against iron core 23 to be reduced. Thus, the collision sound produced when armature 25 collides against iron core 23 can be reduced. Furthermore, the decreased moving speed of movable spring 35 stopper 5 allows the contact bounce to be reduced. Thus, the contact erosion caused by the arc during the contact bounce can be reduced, so that the on-off life of the contact is extended.

In electromagnetic relay 1, when the current supplied to exciting coil 21 is cut off and stopper 5 abuts on armature 25, stopper 5 is deformed due to the elasticity. By this deformation, the impact that armature 25 gives to stopper 5 at the time of return can be reduced (absorbed or relaxed). Therefore, the collision sound produced when armature 25 collides against stopper 5 can be reduced.

In addition, stopper 5 and movable portion 36 (including movable contacts 391 and 392) of movable spring 35 are made of metal. Thus, the contact between stopper 5 and movable portion 36 (movable contacts 391 and 392) of movable spring 35 indicates the contact between metal components. Therefore, in this case, abrasion powder is hardly generated compared with a case of employing a resin-made stopper. Even when abrasion powder is generated, the abrasion powder is metal powder and hence a conduction failure hardly occurs between fixed contacts 31 and 32 and movable contacts 391 and 392 of movable portion 36 of movable spring 35.

In electromagnetic relay 1, the same part (abutting portion 53) of stopper 5 abuts on movable spring 35 when exciting coil 21 is energized, and abuts on armature 25 when the current supplied to exciting coil 21 is cut of. Thus, compared with a stopper having mutually different contact parts, stopper 5 can be formed in a simple configuration. In electromagnetic relay 1, the number of components can be made smaller than that in the case where the component on which movable spring 35 abuts when exciting coil 21 is energized is different from the component on which armature 25 abuts when the current supplied to exciting coil 21 is cut off.

In electromagnetic relay 1, even when magnet 61 is disposed in a position separate from the contacts (fixed contacts 31 and 32 ;And movable contacts 391 and 392), the magnetic flux densities near the contacts and in the arc extinguishing space can be increased by using yoke 62. Thus, the breaking capability can be increased without enlarging electromagnetic relay 1.

In addition, yoke 62 is provided with cutout 65 between adjacent portions 63 and 64 adjacent to fixed contacts 31 and 32. Therefore, the magnetic flux can be concentrated to the vicinity of each contact. Thus, in electromagnetic relay 1, the magnetic flux density near each contact can be greater than that in an electromagnetic relay including a yoke having no cutout. As a result, the breaking capability can be further increased.

In electromagnetic relay 1, length L1 of yoke 62 may be longer than distance L2 between fixed contacts 31 and 32 in the direction in which fixed contacts 31 and 32 are arranged (first direction D1), namely in the direction in which the arcs are prolonged. In this configuration, the arcs can be prolonged longer. Thus, the arcs can he extinguished rapidly, and hence the breaking capability can be further increased.

Figure 14:
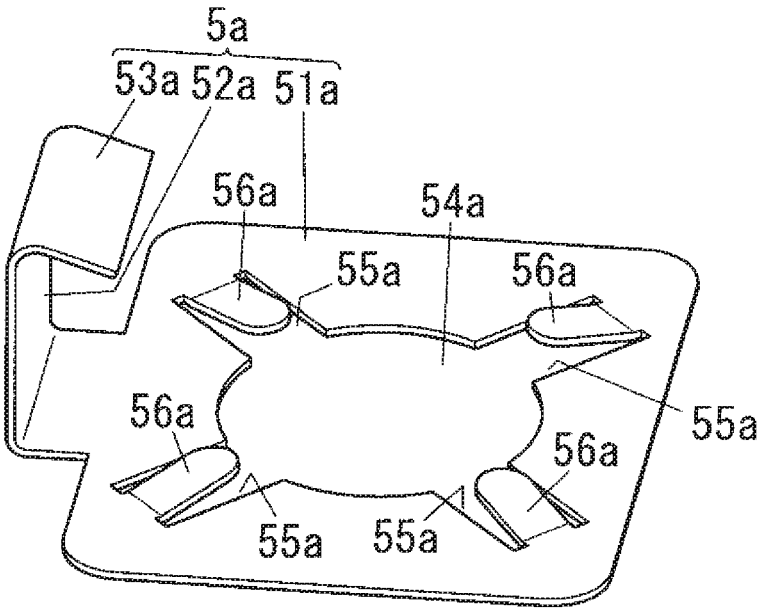
FIG. 14 and FIG. 15 are perspective views of stoppers in modified examples of the exemplary embodiment of the present disclosure.
Figure 15:
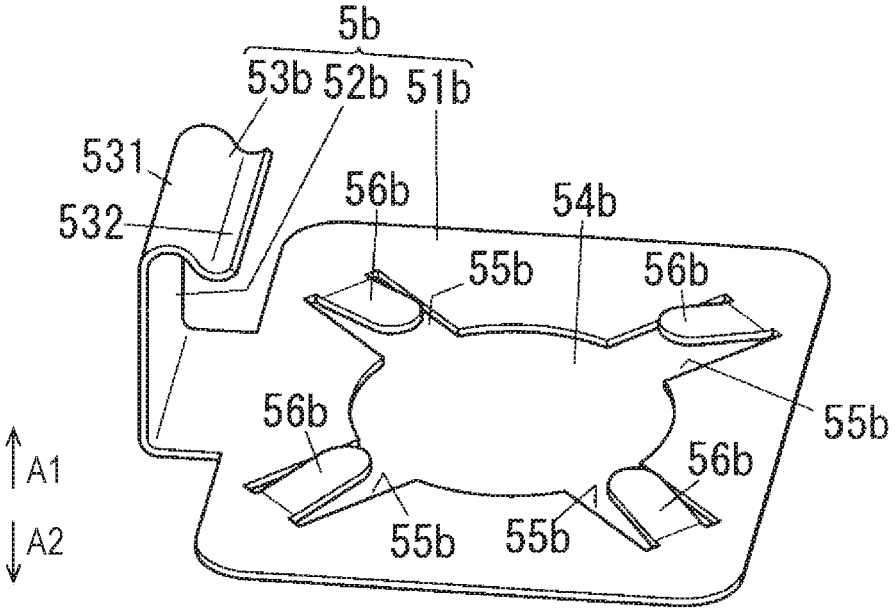
Figure 16:
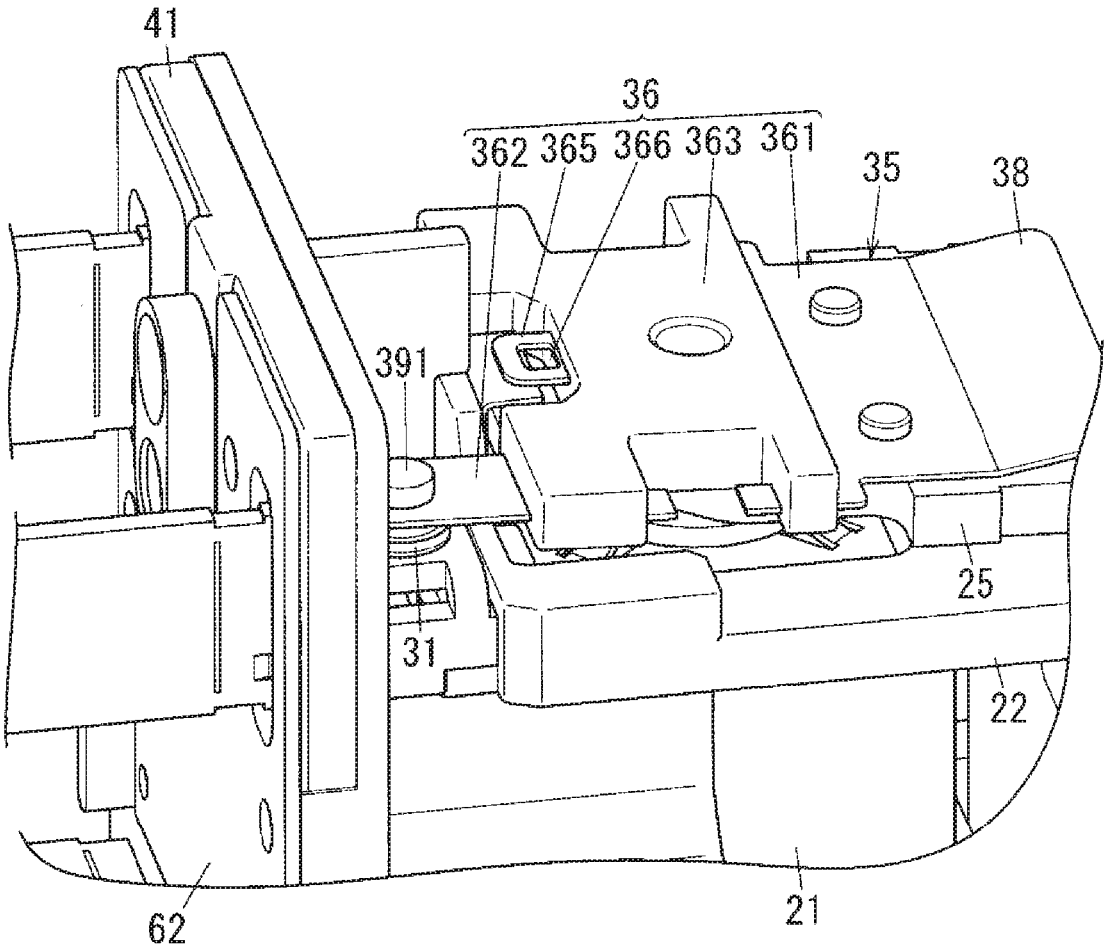
FIG. 16 is a perspective view of an essential part of an electromagnetic relay in another modified example of the exemplary embodiment of the present disclosure.

Next, modified examples of the present exemplary embodiment are described with reference to FIG. 14 to FIG. 16. FIG. 14 and FIG. 15 are perspective views of stoppers in the modified examples of the present exemplary embodiment. FIG. 16 is a perspective view of an essential part of an electromagnetic relay in another modified example of the present exemplary embodiment.

Electromagnetic relay 1 may include stopper 5a shown in FIG. 14 instead of stopper 5. Stopper 5a is integrally formed of base 51a, extending portion 52a, and abutting portion 53a. Base 51a has a configuration similar to that of base 51 (shown in FIG. 3) of stopper 5. Through hole 54a, recesses 55a, and contact pieces 56a are similar to through hole 54, recesses 55, and contact pieces 56 (shown in FIG. 3) of stopper 5, respectively. Extending portion 52a has a configuration similar to that of extending portion 52 (shown in FIG. 3) of stopper 5.

Abutting portion 53a is projected from the tip of extending portion 52a so as to have an angle less than 90° with respect to extending portion 52a. In other words, the tip of abutting portion 53a is closer to base 51a than its base end is. Except for the above-mentioned point, abutting portion 53a is similar to abutting portion 53 (shown in FIG. 3) of stopper 5.

Electromagnetic relay 1 may include stopper Sb shown in FIG. 15 instead of stopper 5. Stopper 5b is integrally formed of base 51b, extending portion 52b, and abutting portion 53b. Base 51b has a configuration similar to that of base 51 (shown in FIG. 3) of stopper 5. Through hole 54b, recesses 55b, and contact pieces 56b are similar to through hole 54, recesses 55, and contact pieces 56 (shown in FIG. 3) of stopper 5, respectively. Extending portion 52b has a configuration similar to that of extending portion 52 (shown in FIG. 3) of stopper 5.

Abutting portion 53b is formed in a curved plate shape. In more detail, abutting portion 53b integrally has first curved surface portion 531 and second curved surface portion 532. First curved surface portion 531 is disposed at the tip of extending portion 52b. First curved surface portion 531 has a curved surface projecting in direction A1 in which movable contacts 391 and 392 of movable portion 36 move away from fixed contacts 31 and 32. Second curved surface portion 532 is disposed at the tip of first curved surface portion 531. Second curved surface portion 532 has a curved surface projecting in direction A2 in which movable contacts 391 and 392 of movable portion 36 approach fixed contacts 31 and 32. Except for the above-mentioned points, abutting portion 53b is similar to abutting portion 53 of stopper 5 shown in FIG. 3.

In movable spring 35 of electromagnetic relay 1, movable portion 36 may include projection 365 shown in FIG. 16 instead of projection 364.

Projection 365 is disposed between movable contacts 391 and 392. More specifically, projection 365 is projected from molded portion 363 between movable contacts 391 and 392. Projection 365 is provided with hole 366. Thus, even when the width of projection 365 is increased to enlarge the contact region between projection 365 and stopper 5, the elasticity of projection 365 can be kept.

In electromagnetic relay 1, magnet 61 may be disposed so as to reverse the N pole and S pole. In other words, magnet 61 may be disposed so that the surface facing exciting coil 21 serves as the N pole and the surface facing yoke 62 serves as the S pole. In this case, it is necessary to reverse the polarities of main terminals 33 and 34. Thus, the arcs generated between movable contacts 391 and 392 and fixed contacts 31 and 32 can be prolonged outward.

Note that electromagnetic relay 1 does not need to include movable contacts 391 and 392, in this case, a part of movable portion 36 of movable spring 35 that faces fixed contact 31 comes into contact with or moves away from fixed contact 31, and a part of movable portion 36 that faces fixed contact 32 comes into contact with or moves away from fixed contact 32. In other words, when exciting coil 21 is energized, movable portion 36 comes into contact with fixed contacts 31 and 32. When the current supplied to exciting coil 21 is cut off, movable portion 36 moves away from fixed contacts 31 and 32.

What is claimed is:

1. An electromagnetic relay comprising:

an exciting coil;

a pair of fixed contacts arranged along a first direction;

a movable spring which comes into contact with or moves away from the pair of fixed contacts in response to current to the exciting coil being turned on or off;

a magnet which prolongs an arc generated between the pair of fixed contacts and the movable spring; and a yoke in contact with the magnet, wherein the magnet is adjacent to the pair of fixed contacts along a second direction orthogonal to the first direction, and is adjacent to the exciting coil along a third direction orthogonal to the first direction and to the second direction, and the yoke is adjacent to the pair of fixed contacts along the third direction when the yoke is in contact with the magnet,

*wherein edges of the yoke extend beyond edges of the magnet in the first direction and the second direction to provide a planar surface in the third direction,*

*wherein the magnet overlaps the yoke along the third direction, and*

*wherein the fixed contacts and the magnet are arranged along the second direction.*

2. The electromagnetic relay according to claim 1, wherein the yoke includes a pair of adjacent portions that are adjacent to the pair of fixed contacts, and is provided with a cutout between the pair of adjacent portions.

3. The electromagnetic relay according to claim 1, wherein the yoke is longer than a distance between the pair of fixed contacts in the first direction.

4. The electromagnetic relay according to claim 1, further comprising:

a case that stores the exciting coil, the pair of fixed contacts, and the movable spring, wherein the case is provided with a recess that opens outwardly at a position adjacent to the exciting coil in the third direction, the magnet is stored in the recess, and the yoke is in contact with an outer surface of the case when the yoke is in contact with the magnet.

5. The electromagnetic relay according to claim 1, wherein the movable spring opposes the pair of fixed contacts in the second direction, and the magnet has:

a first pole which is in contact with the yoke; and a second pole which opposes the exciting coil, and the magnet is adjacent to the pair of fixed contacts on an opposite side to the movable spring, and is capable of generating a magnetic flux in the third direction between the movable spring and the pair of fixed contacts.

6. The electromagnetic relay according to claim 1, wherein a first end of said movable spring comes into contact with or moves away from the pair of fixed contacts and an opposite end of the movable spring is connected to [the] *another* yoke.

7. The electromagnetic relay according to claim 1, the exciting coil including an aperture within which a core is received, [the] *and another* yoke including an aperture that receives a portion of the core.

8. The electromagnetic relay according to claim 1, said movable spring comprising a generally L-shaped spring member, a first leg of said L-shaped spring member connected to [said] *another* yoke, and a second leg of said L-shaped spring member including a pair of contact portions configured to come into contact with said fixed contacts.

9. The electromagnetic relay according to claim 1, [said yoke] *further* comprising *another yoke including* a generally L-shaped member having two legs, one end of said movable spring being connected to one leg of said *other* yoke, said one leg being positioned opposite said magnet with respect to said exciting coil.

10. The electromagnetic relay according to claim 1, further comprising an armature attached to a portion of the movable spring, said armature being configured to move into and out of contact with said exciting coil in a direction substantially the same as a direction of movement of said movable spring towards and away from contact with the pair of fixed contacts.

*11. An electromagnetic relay comprising:*

*an exciting coil;*

*a first fixed contact;*

*a second fixed contact;*

*a movable contact provided on a movable spring that bends around a fixed portion, such that the movable contact moves along a path to come into contact with or move away from the first fixed contact or the second fixed contact in response to a current to the exciting coil;*

*a yoke adjacent to the movable contact and extending along said path on a side of the movable contact opposite to said fixed portion; and*

*a magnet connected with the yoke, the magnet and the yoke generating a flux proximate the movable contact, wherein the magnet is positioned proximate to the movable contact in a direction along said path,*

*wherein the yoke extends along two extending directions to provide a planar surface of the yoke in an orthogonal direction that is orthogonal to the two extending directions,*

*wherein the magnet extends along the two extending directions to provide a planar surface of the magnet in the orthogonal direction that is orthogonal to the two extending directions,*

*wherein a size of the planar surface of the magnet being larger than a size of each side surface of the magnet orthogonal to the planar surface of the magnet, and*

*wherein the planar surface of the magnet is in contact with the planar surface of the yoke.*

*12. The electromagnetic relay according to claim 11,*

*wherein the yoke is longer than a distance between the first fixed contact and the movable contact in said direction when the movable contact is disconnected from the first fixed contact.*

* * * * *